Oct. 11, 1966    JACQUES JEAN-MARIE JULES GERIN    3,278,197
ADJUSTABLE SUSPENSION, MORE PARTICULARLY
INTENDED FOR AUTOMOBILE VEHICLES
Filed Sept. 30, 1964    10 Sheets-Sheet 1
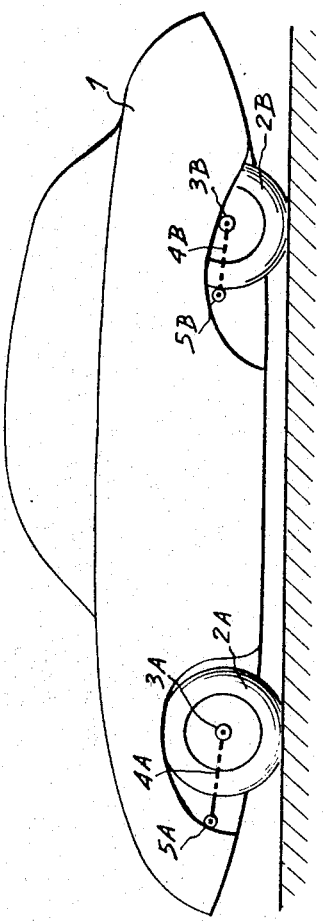
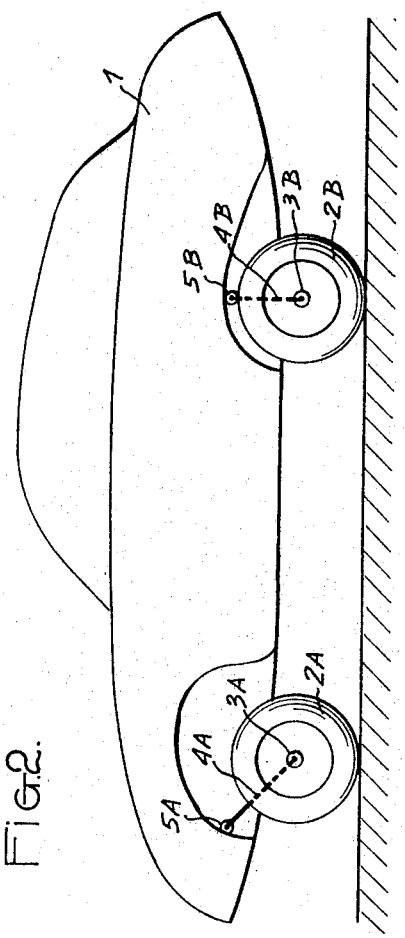
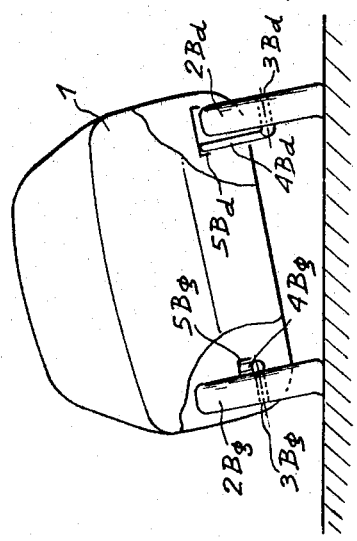
Inventor:
Jacques Jean-Marie Jules Gerin
By
Karl W. Klocks
Attorney Oct. 11, 1966

JACQUES JEAN-MARIE JULES GERIN

ADJUSTABLE SUSPENSION, MORE PARTICULARLY
INTENDED FOR AUTOMOBILE VEHICLES

Filed Sept. 30, 1964

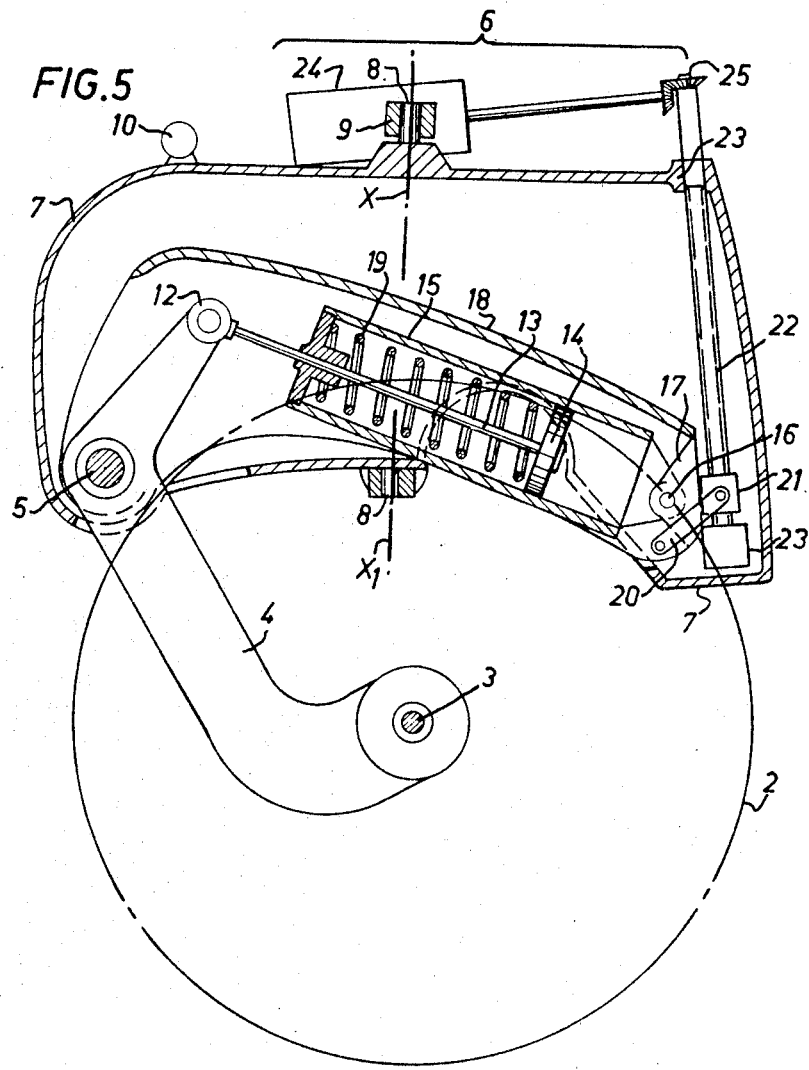
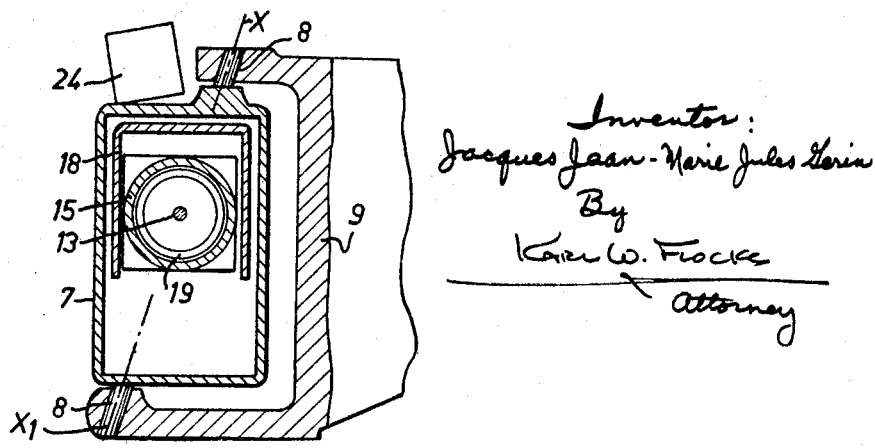

Oct. 11, 1966 — JACQUES JEAN-MARIE JULES GERIN — 3,278,197
ADJUSTABLE SUSPENSION, MORE PARTICULARLY INTENDED FOR AUTOMOBILE VEHICLES
Filed Sept. 30, 1964 — 10 Sheets-Sheet 4

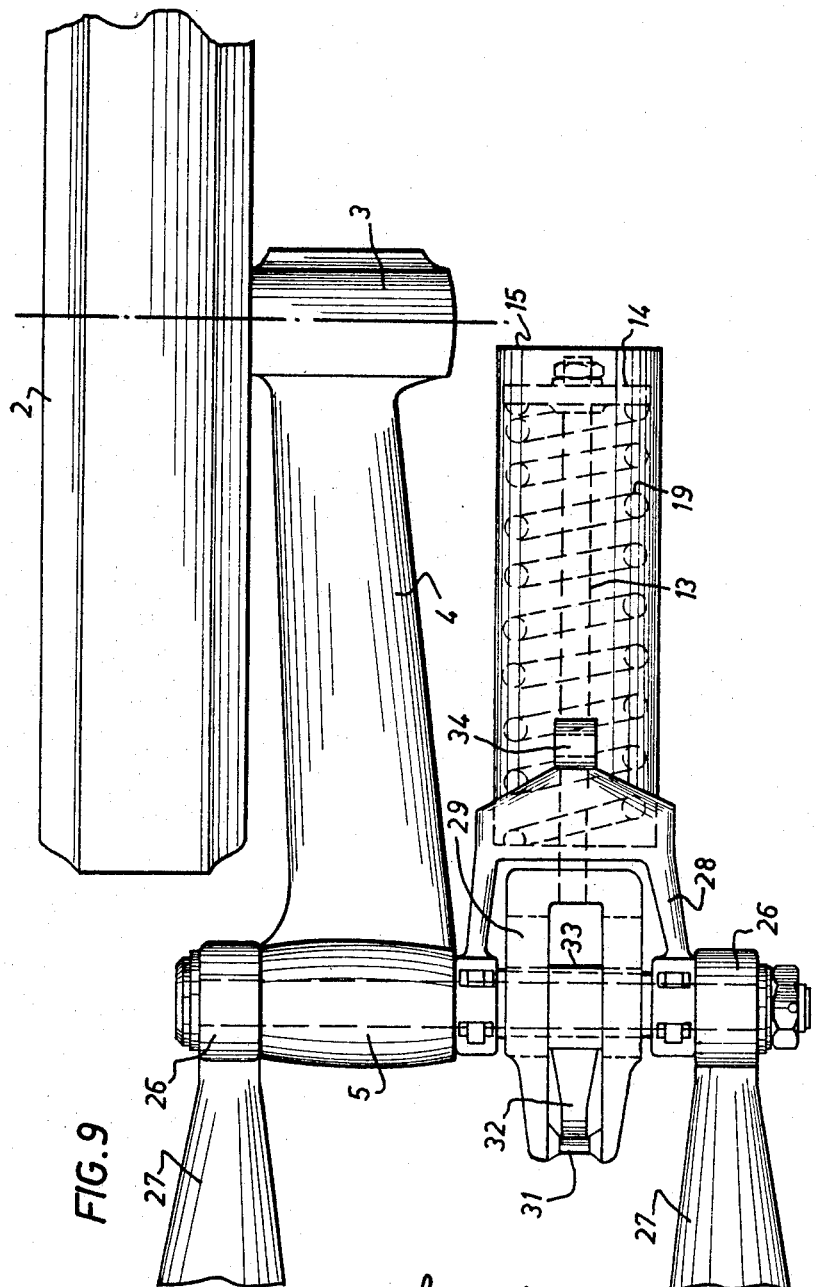

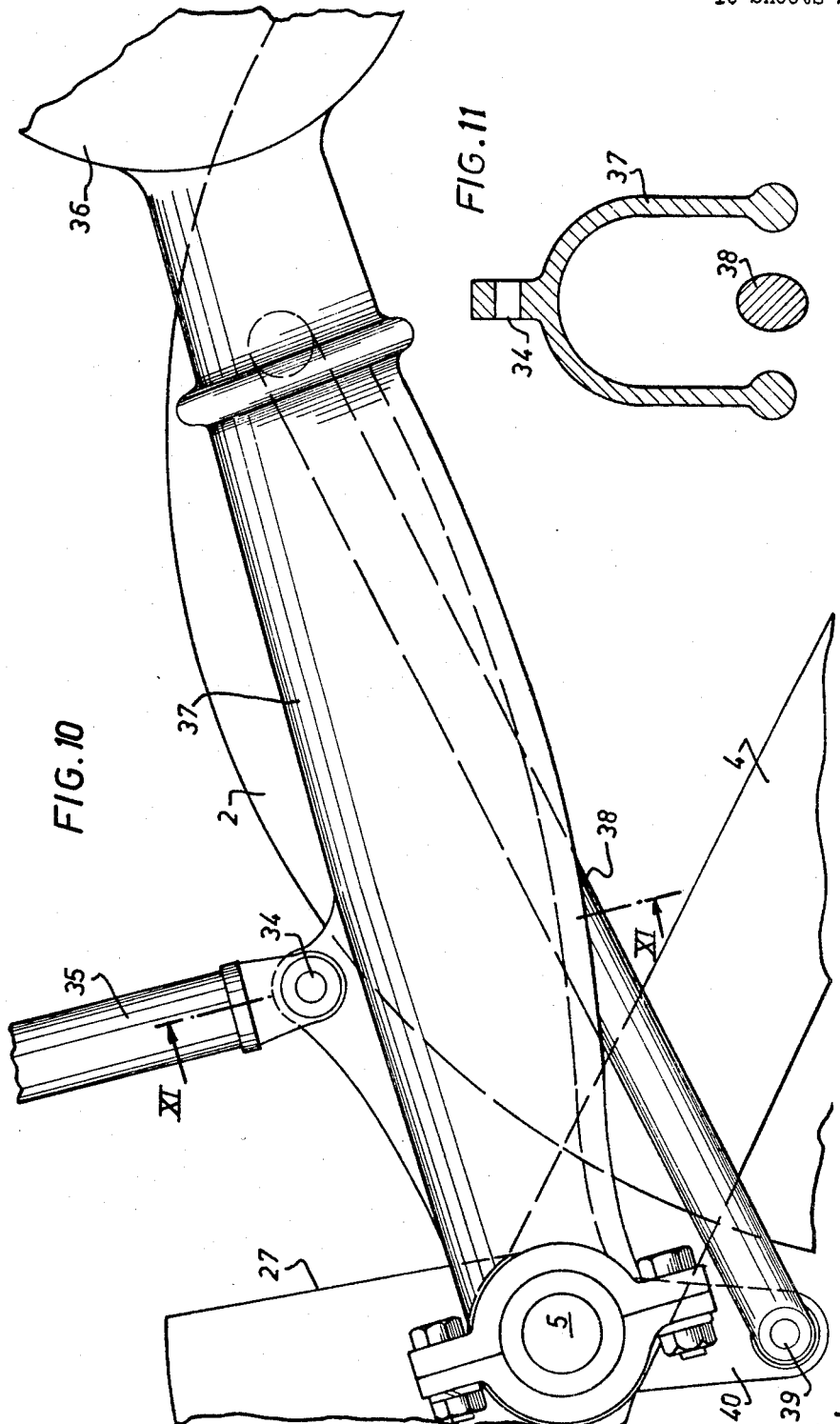

Oct. 11, 1966
JACQUES JEAN-MARIE JULES GERIN
ADJUSTABLE SUSPENSION, MORE PARTICULARLY
INTENDED FOR AUTOMOBILE VEHICLES
Filed Sept. 30, 1964
3,278,197
10 Sheets-Sheet 8
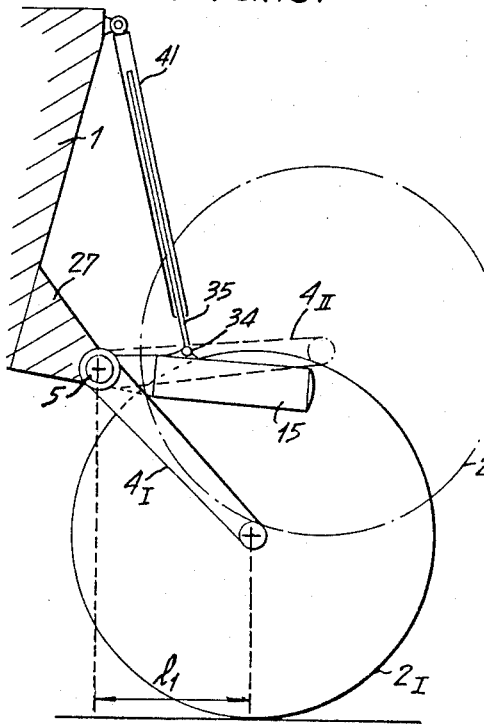
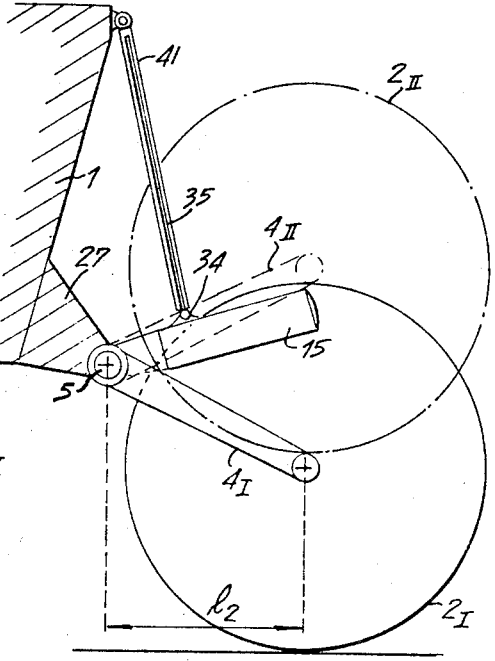

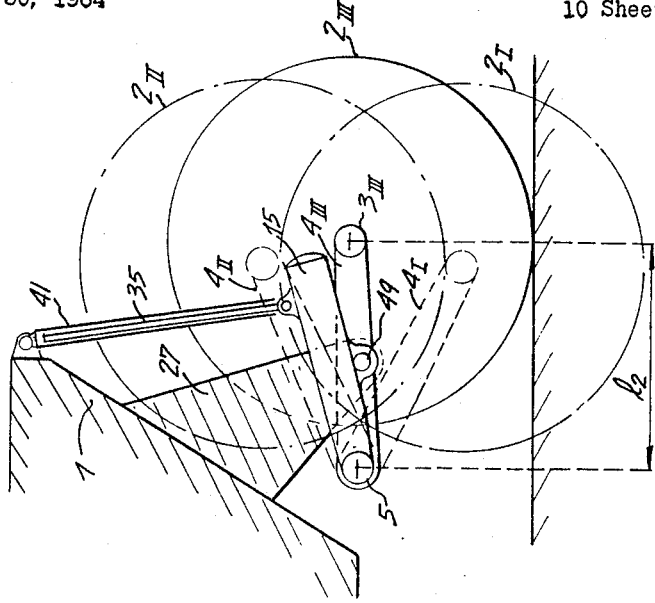
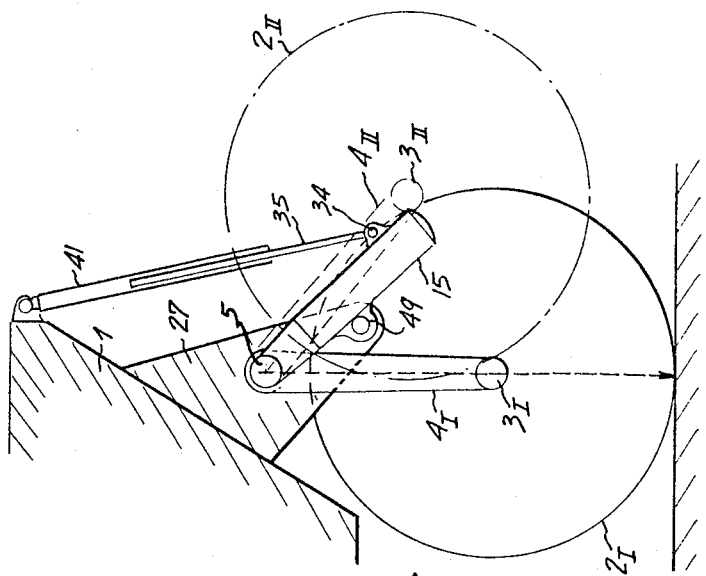

United States Patent Office 3,278,197
Patented Oct. 11, 1966

1

3,278,197
ADJUSTABLE SUSPENSION, MORE PARTICULARLY INTENDED FOR AUTOMOBILE VEHICLES
Jacques Jean-Marie Jules Gerin, 86 Avenue Victor-Hugo, Dijon, Cote d'Or, France
Filed Sept. 30, 1964, Ser. No. 400,391
Claims priority, application France, Oct. 3, 1963, 949,500
5 Claims. (Cl. 280—124)

Automobile vehicles intended to circulate over the most varied types of ground at higher and higher speeds, must have a suspension which can adapt itself in an almost instantaneous manner to the state of the ground and to the magnitude of the speed and to the evolutions rendered necessary by the outlines of the roads.

The present invention relates to an adjustable suspension which enables the driver of an automobile vehicle provided with such a suspension to modify at will, both when stationary and while running, the characteristics of the suspension of his vehicle and, more particularly, to vary the relative position of the wheels with respect to the suspended system. This possibility of adjustment of the suspension enables the driver, amongst other possibilities, to incline the suspended system of his vehicle towards the inside of the turns and thereby to counterbalance effectively the action of centrifugal force on the said suspended system.

The adjustable suspension according to the invention is essentially characterized by the fact that each of the wheels of the vehicle has its own absolutely independent suspension system, the adjustment of which can be modified at will, even while running, by the driver of the vehicle or by an automatic or semi-automatic device released by a pendulum, a fly-weight or any other appropriate control means.

Each independent suspension system is characterized by the combination:

of a wheel-carrier lever pivoted on an axis disposed in a horizontal plane perpendicular to the longitudinal plane of symmetry of the vehicle when this latter is moving in a straight line;

of a deformable elastic device which may be mechanical or hydraulic or hydro-pneumatic, etc., capable of pivoting about the same pivotal axis as that of the wheel-carrier lever;

of a connection system between the wheel-carrier lever and the elastic system such that when this latter is locked in any given position, any movement of the wheel brings the deformable elastic system into operation;

of supporting means for the assembly comprising the wheel-carrier lever, the elastic deformable element and the connection system, the said means being so arranged that the said assembly can pivot about a pivotal axis;

of a mechanical, hydraulic, electric, etc., system of control, capable of causing the elastic deformable device to pivot about the pivotal axis of the assembly specified above, between two limiting positions and to immobilize it in any intermediate position;

and, when so required, of means for lifting the assembly comprising the elastic system, the lever, and the pivoted control system with respect to the body of the vehicle, in the case where the lever carries a front wheel.

In accordance with other characteristic features of the invention:

The pivotal axis of the elastic system, wheel-carrier lever assembly is coincident with the common pivotal axis of the said lever and elastic system;

According to an alternative form of construction, the

2 pivotal axis of the elastic system-wheel carrier lever assembly is displaced towards the rear with respect to the direction of forward movement of the vehicle and is arranged parallel to the common pivotal axis of the said lever and elastic device;

The deformable elastic device is provided with an elastic system having a variable flexibility to compensate the variation of the force applied to the suspension member as a function of the relative position of the lever-elastic system assembly with respect to the vehicle;

The pivotal control systems of each of the elastic device-lever assemblies are preferably controlled by an assembly such that the two control systems actuating the suspensions of the two right-hand vehicle wheels and the two control system actuating the suspensions of the two left-hand wheels of the vehicle are actuated by two contacts mounted on the steering wheel of the vehicle.

Other characteristic features, advantages and particularities of the present invention will be brought out in the description which follows below with reference to the accompanying drawings, representing diagrammatically and merely by way of examples, various possible forms of embodiment of the said invention.

In these drawings:

FIG. 1 is a very diagrammatic view in elevation of an automobile vehicle provided with an adjustable suspension according to the invention, this suspension being shown in its bottom position.

FIG. 2 is a view in elevation similar to that preceding the suspension being shown in this case in the top position.

FIG. 3 is a very diagrammatic rear view of the vehicle of FIGS. 1 and 2, the suspension being shown in the position which it occupies during a turning of the vehicle towards the left.

FIG. 5 is a view in elevation-section similar to that of FIG. 4, but the device being shown in this case in the position corresponding to the high position of the vehicle.

FIG. 6 is a view in transverse section of the suspension device, the cross-section being taken along the line VI—VI of FIG. 4.

FIG. 9 is a plan view to a smaller scale of the device shown in FIG. 8.

FIG. 10 is a view in elevation of a further form of possible construction of the adjustable suspension device according to the invention, arranged so as to provide the hydro-pneumatic suspension of a rear wheel, the device being shown in the position corresponding to the low position of the vehicle.

FIG. 11 is a transverse section of the device shown in FIG. 10, the section being taken along the line XI—XI of FIG. 10.

FIGS. 12, 13 and 14 are diagrams explaining the operation of the suspension device according to the invention, shown in three different positions, in the case where the pivotal axis of the device proper on the vehicle is coincident with the pivotal axis of its two essential constituent elements.

FIGS. 16 and 17 are explanatory drawings of the operation of the same device as that of FIGS. 12, 13 and 14, shown in two different positions, in the case where the two pivotal axes are not coincident.

Figure 4:
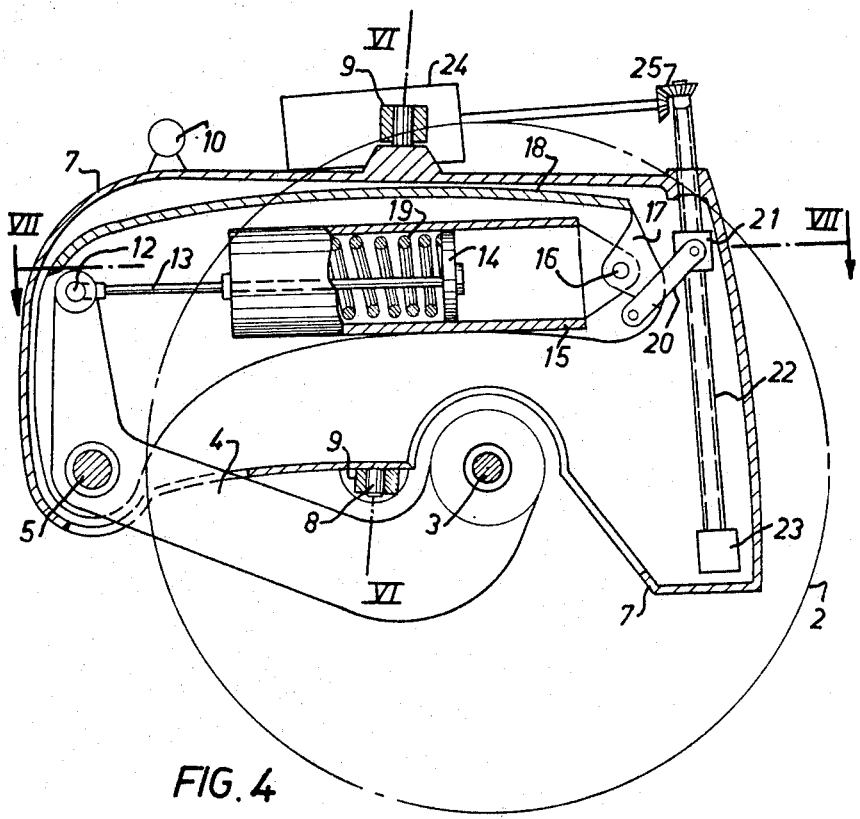
FIG. 4 is a view in elevation-section of a possible form of construction of the adjustable suspension device according to the invention arranged so as to provide the suspension of a front wheel, the device being shown in the position corresponding to the low position of the vehicle.

The principle of the adjustable suspension device according to the present invention may be defined in general terms by the possibility which is offered to the driver of an automobile vehicle to modify at will either when stopped or during running, the characteristics of the suspension of his vehicle, and more precisely, to vary the relative position of the wheels with respect to the vehicle. This modification of the suspension may be effected either wheel by wheel or axle by axle, or for all wheels, or again per group of front and rear wheels, left-hand or right-hand.

Apart from direct manual operation by the driver, by electric contacts for example, all these operations can be initiated by automatic or semi-automatic means based on known principles brought into play by inertia, centrifugal force, speed, etc.

The diagrams shown in FIGS. 1, 2 and 3 give an idea of the essential possibilities of utilization of the invention.

In FIGS. 1 and 2, the reference 1 represents the body of an automobile vehicle of any known type with front wheel or rear wheel drive, the wheels of the front wheel train being shown at 2A and those of the rear wheel train at 2B. In order to avoid any ambiguity, the above references and those which will be utilized later have been provided in FIG. 3 with the index $g$ when they represent a left-hand element of the vehicle, and with the index $d$ when they represent a right-hand element of the vehicle.

In accordance with the invention, each of the wheels 2A of the front axle and each of the wheels 2B of the rear axle is mounted on a journal 3A or 3B fixed at the extremity of a corresponding lever 4A or 4B pivoted at its other extremity on a shaft 5A or 5B.

For the moment when only the principle of the invention is being discussed, the fact will be recalled that the levers 4B$g$ and 4B$d$ supporting the rear wheels are pivoted on shafts fixed to the body, while the shafts 5A of the lever 4A supporting the front wheels are rigidly fixed on respective assemblies coupled to the steering system and which will be described in detail later.

For technical reasons which will become apparent from the detailed description of the different possible forms of embodiment of the invention, reference will only be made for the moment to the arrangement in which the levers 4A carrying the front wheels are longer than the levers 4B carrying the rear wheels (for reasons of castor-action angle) and that the respective pivotal axes 5A and 5B of these levers are arranged so that the levers 4A and 4B are substantially horizontal when the vehicle is at its maximum low position shown in FIG. 1, while the front levers 4A are still inclined when the rear levers 4B are vertical, in the maximum high position of the vehicle shown in FIG. 2.

It can immediately be seen from examination of the drawings that by operating the wheel-supporting levers in the manner which will be described in detail later, the driver can, at will:

Either maintain his vehicle in the maximum low position of FIG. 1;
Or maintain his vehicle in the maximum high position of FIG. 2;
Or pass from one position to the other or vice-versa and maintain the vehicle in one of the intermediate positions;
Or again, incline his vehicle more or less considerably towards the inside of the turn in order to counterbalance the action of centrifugal force which tends to cause the vehicle to tilt towards the outer side of the turn.

As has already been seen, one of the essential features of the present invention resides in that each wheel is completely independent and has its own strictly separate suspension system.

Reference will now be made by way of example to FIGS. 4, 5, 6 and 7 which show a first possible form of construction of an adjustable suspension system for a front wheel, in accordance with the present invention.

As has already been seen with reference to FIGS. 1 to 3, the wheel 2 is mounted on a journal 3 provided at the extremity of a lever 4 pivoted on a shaft 5 fixed to an assembly having the general reference 6, which is coupled to the steering system.

More particularly, this assembly 6 comprises a casing 7 of elongated form, provided with a pivot 8 rotating at its two extremities in a fork 9 rigidly fixed to the body of the vehicle.

It will of course be understood that according to the type of vehicle on which the unit is mounted, the axis XXI of the pivot will be given the desired angle of inclination and angle of castor.

Figure 7:
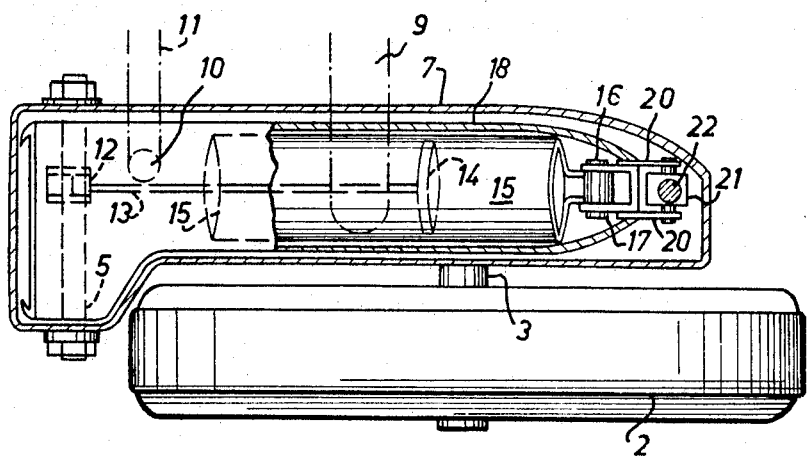
FIG. 7 is a view in longitudinal section of the same device, the section being taken along the line VII—VII of FIG. 4.

In addition, the casing 7 comprises at its upper portion a knucklejoint 10 which enables the moving assembly 6 thus formed to be coupled to the steering rod system, of which a rod 11 has been shown diagramatically in FIG. 7.

The lever 4 is extended beyond the pivotal shaft 5 by an elbowed portion substantially at right angles, and the extremity of which is articulated on a fork 12 fixed to the extremity of the rod 13 of a piston 14 which can slide in a cylinder 15. This latter is pivoted at its free extremity on a shaft 16 mounted in a fork 17 rigidly fixed to a lever 18 having a reversed U-section enclosing the cylinder 15 and the extension of the lever 4, the said lever 18 being pivoted at its front extremity on the pivotal axis 5 of the lever 4 which carries the wheel 3. It should be noted that the pivotal axis 5 is arranged so as to be located perpendicular to the longitudinal axis of the vehicle when the latter is moving in a straight line.

Inside the cylinder 15 is housed a spring 19 between the front end of the cylinder through which passes the rod 13 and the piston 14. The assembly 12, 13, 14, 15 and 19 which has just been described permits the spring 9 to play the part of an elastic deformable element of the lever 4 carrying the wheel 2, it being understood that this could be replaced by or combined with a deformable elastic hydraulic element or the like, without departing from the scope of the invention.

In accordance with an essential feature of the present invention, the driver can cause the wheel-carrier lever and elastic element assembly to pivot at will about the shaft 5, for example in order to cause it to pass from the position shown in FIG. 4 to the position shown in FIG. 5, these positions corresponding respectively to the maximum low position of the vehicle of FIG. 1 and to the maximum high position of FIG. 2. It will be noted that in FIG. 4 the spring 19 of the deformable elastic unit is compressed whereas it is almost fully extended in the case of FIG. 5.

The result desired, namely the pivotal movement of the lever 18 about the shaft 5, can be obtained in any appropriate manner: hydraulically, pneumatically, electrically, mechanically. In the form of construction shown by way of example in FIGS. 4 and 5, this control is effected electro-mechanically. To this end, the rear extremity of the lever 18 is connected by coupling rods 20 to a nut 21 fitted on a threaded rod 22 capable of rotating in bearings 23 rigidly fixed on the casing 7. An electric motor 24 of small power but capable of running at high speed is fixed on the casing 7 and drives the threaded rod 22 through the intermediary of a bevel drive 25. It can immediately be seen that, by operating the electric motor in one direction or the other, the screw 21 is caused to move upwards or downwards with a corresponding pivotal movement of the lever 18 about the pivot 5. On the other hand, the lever 18 can be stopped in any intermediate position by stopping the motor 24.

Before proceeding further with the description of alternative forms of embodiments of the invention, the following important observation should be made:

Given that the vehicle is moving in a straight line, the main pivotal axes 5 of the suspension systems are all located in a horizontal plane, and are perpendicular to the longitudinal plane of symmetry of the vehicle, it is seen that the movement of each of the wheels takes place in an absolutely vertical plane or, if there is a body angle, this latter is strictly maintained, irrespective of the relative position of the wheel with respect to the vehicle.

The result of this absolutely constant value of the track is that the road holding properties of a vehicle fitted with an adjustable suspension according to the invention are considerably improved by the elimination of any movement of yawing or rolling.

On the other hand, the horizontal pivot axis 5, being very rigid does not permit any torsion of the suspension system of each wheel, and this remains true of the front wheels.

Finally, the elastic system placed very high above the journal of the wheel brings the rolling axis to a distance very close to the centre of gravity, which facilitates the negotiation of turns.

Figure 8:
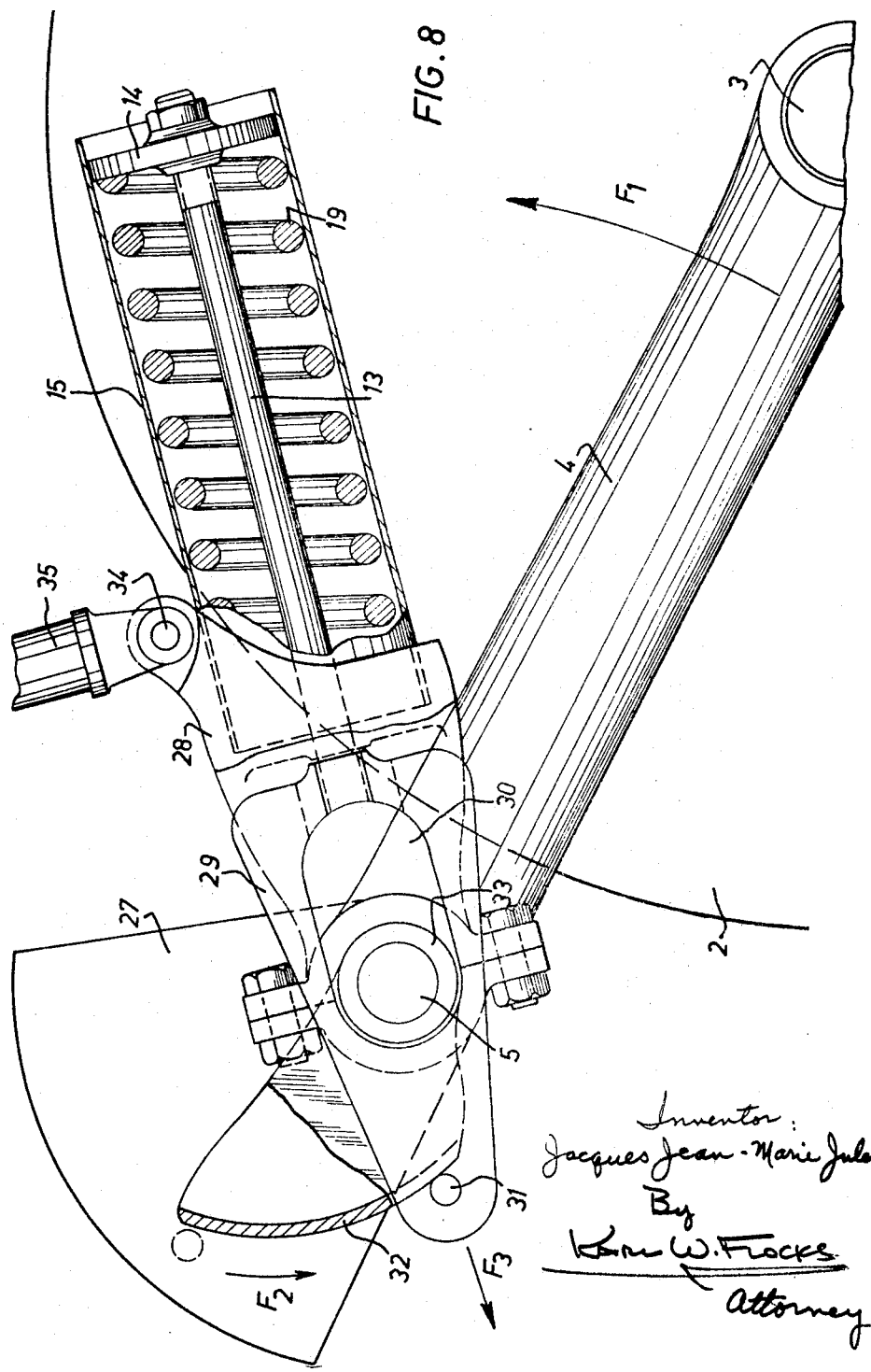
FIG. 8 is a view in elevation with partial cross-section of a further possible form of embodiment of the adjustable suspension device according to the invention, arranged so as to provide the suspension of a rear wheel, the device being shown in the position corresponding to the low position of the vehicle.

According to a further possible form of embodiment of the invention shown by way of example in FIGS. 8 and 9, which is applied to the suspension of a rear wheel, an assembly is produced such that the pivotal axis of the wheel-carrying lever 4 is coincident with the pivotal axis of the deformable elastic unit 15. In addition, the straight line along which the elastic deformations are effected, the deformable element being in this case a helicoidal spring, passes through the centre of the pivotal axis.

To this end, the common pivotal axis 5 is mounted freely at its two extremities in bearings 26 mounted on supports 27, rigidly fixed to the body of the vehicle. In this form of construction, the wheel-carrier lever 4 is not provided with an extension as in the form of embodiment previously described, but its upper extremity is keyed on the shaft 5, the coupling between the said lever and its deformable elastic system being obtained as follows:

The cylinder 15 of the elastic system is pivotally mounted on the shaft 5 through the intermediary of a supporting stirrup 28, the two arms of which are pivoted freely on the said shaft.

On the other hand, on the free extremity of the rod 13, of the piston 14, a second stirrup 29 is mounted between the arms of the supporting stirrup 28, the arms of the stirrup 29 being provided with oblong slots 30 which are capable of sliding freely about the pivotal shaft 5, and are connected at their free extremities by a cross member 31. This latter is in contact with the periphery of a plate 32 forming a cam, the extremity of which is mounted on a sleeve 33 fixed in turn on the pivotal shaft 5. Finally, on the upper portion of the stirrup 28 carrying the cylinder 15 of the deformable elastic system, is mounted a shaft 34 on which is pivoted the lower extremity of the driving shaft 35, which is preferably the rod of a hydraulic jack.

The system then being given the position shown in FIG. 8, it can immediately be seen that if the wheel-carrying lever 4 is rocked in the direction of the arrow $F_1$, the cam 32 rocks in the direction $F_2$. This has the result of driving the stirrup 29 in the direction $F_3$ and in consequence of causing the compression of the spring 19, and vice-versa.

The possibilities of operation of this particular form of construction of the suspension device according to the invention will be discussed later, in more detail.

In FIG. 10, there has been shown another form of possible construction of the invention applied to a rear wheel suspension of the hydro-pneumatic type.

It can be seen that as in the previous case described, the wheel-carrier lever 4 is fixed on the shaft 5 carried by the supports 27, the said shaft 5 also serving as a pivotal shaft for the deformable elastic system which, in the example shown, is constituted by a conventional suspension sphere 26 which, contrary to known systems, is mounted at the extremity of a lever 37 which is in turn freely pivoted at its front extremity on the shaft 5. On the upper portion of the lever 37 is mounted the shaft 34, on which is pivoted the lower extremity of the driving rod 35, which is advantageously that of a hydraulic jack or of any other control device, electro-mechanical for example.

As can be seen better from FIG. 11, the lever 37 has a section in the form of a reversed U, inside which can move a driving rod 38, one of the extremities of which is pivoted on the elastic system of the suspension sphere 36 and the other extremity of which is pivoted on a shaft 39 mounted at the extremity of an arm 40, which is fixed on the pivotal shaft 5.

Without going into detail, it can immediately be seen that any movement of the wheel-carrier lever 4 brings the deformable elastic system into operation.

The operation of the device in accordance with the invention will now be described in more detail, first of all with reference to the group of drawings 12, 13 and 14, which concern a suspension in which the pivotal shaft of the whole of the device proper on the supports 27 of the vehicle 1 is coincident with the pivotal shaft 5 of the two constituent elements of the device, namely the wheel-carrier lever 4 and the elastic system 15. This is for example the case of the forms of embodiment of FIGS. 8 and 9 on the one hand and 10 and 11 on the other, which have been described in detail above.

It should be noted that, in order to simplify the drawings the coupling system between the wheel-carrier lever 4 and the deformable elastic system 15 has not been shown. However, it is quite obvious that for any given position of the elastic system 15 there will correspond, for the wheel-carrier lever 4:

(a) A limiting lower position shown in full lines and given the reference $4_I$, which corresponds to a completely expanded elastic system;

(b) A limiting upper position shown in dotted lines and given the reference $4_{II}$ which corresponds to a fully stretched elastic system;

(c) A succession of instantaneous intermediate positions between the two extreme positions, which change as a function, on the one hand of the position of the elastic unit 15 with respect to the vehicle 1, and on the other hand of the essential conditions such as the weight of the vehicle, the profile of the road, the live forces applied to the vehicle, etc.

It will at once be seen that if the driver, by an operation which will be described in detail later, brings the elastic unit 15 into the position shown in FIG. 12, the wheel-carrier lever is brought into the position $4_I$ corresponding to the maximum high position of the vehicle, or into a horizontal trim, as in the case of FIG. 2, or into an inclined trim position, as in the case of FIG. 3, right-hand rear wheel.

On the other hand, it should be observed that statically the vehicle is maintained in this high position without any elastic interposition, since the wheel-carrier lever is vertical. On the other hand, from the dynamic point of view, the vehicle is elastically suspended. In fact, as soon as a wheel in the position $2_I$ comes up against a rough patch or other obstacle in the road, it is driven towards the rear, thus causing the inclination of the lever 4 and the immediate operation of the deformable elastic system. It should be noted furthermore that in this high position, the force applied on the elastic system is small.

Upon passing to the intermediate position shown in FIG. 13, which corresponds to the average position of transport, it can immediately be seen that the weight of the vehicle will now be operative and will apply a relatively large load on the elastic system. Assuming for a moment that the elastic system has a constant value, it will be seen that in the case of FIG. 12, the moment with respect to the shaft 5 of the couple of the applied forces passing from a zero value to a value of $C \times l_1$, the elastic system will be compressed and the vehicle will be balanced in reality at a lower position than that shown in FIG. 13.

In FIG. 14 there has been shown the maximum low position corresponding to that of FIG. 1, for a horizontal trim of the vehicle, and to that of the rear left-hand wheel of FIG. 3 for an inclined trim of the vehicle.

The compression of the elastic system will again be increased with respect to that of FIG. 13, since the moment of the forces applied with respect to the shaft 5 will this time reach the value $C \times l_2$. In reality, the wheel-carrier lever 4 will occupy a practically horizontal position.

Figure 12:
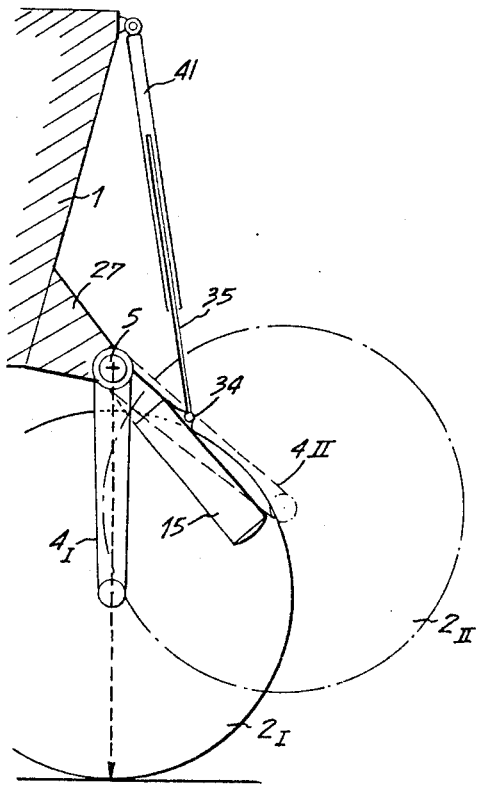

It is clear from the description of FIGS. 12, 13 and 14 that there is an advantage in utilizing a deformable elastic device with variable flexibility, it being understood that the same reasoning is applicable in the case of suspension of a front wheel, such as for example in that of a suspension of the type shown in FIGS. 4, 5, 6 and 7.

Figure 15:
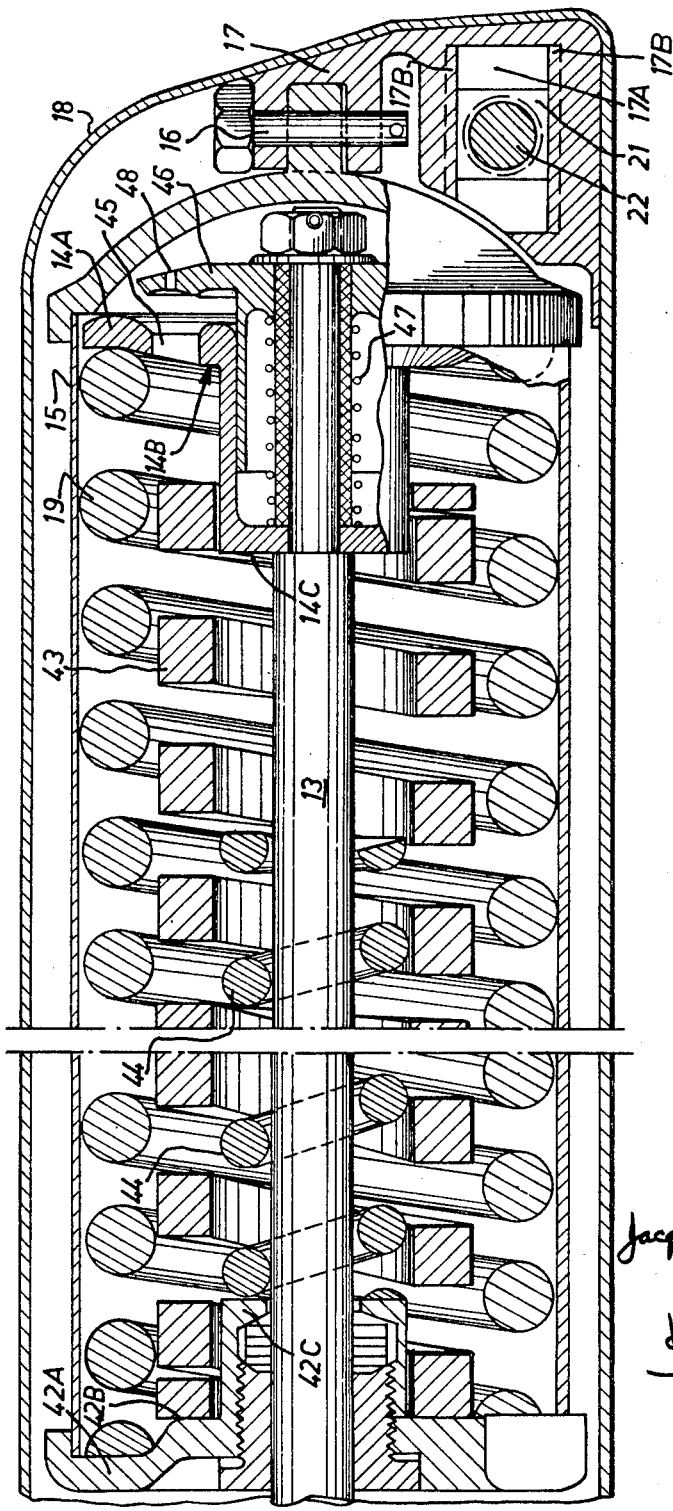
FIG. 15 is a detailed view to a larger scale, representing in longitudinal section a preferred form of construction of the elastic system of the suspension device in accordance with the invention.

There has been shown in FIG. 15 a possible form of construction of an elastic deformable device with variable flexibility, applicable to the cases referred to above, and more particularly to the case of FIGS. 4 to 7, the constituent elements of which have been represented with a slight modification as regards the possibility of relative movement between the nut 21 fitted on the threaded rod 22 and the support 17 fixed on the lever 18, and on which the extremity of the cylinder 15 is pivoted. In this alternative, the nut 21 is mounted so as to be capable of sliding longitudinally in a slot 17A formed in the support 17, this slot being provided with guiding grooves 17B.

In the example shown, the spring 19 which is supported between the outer portion 42A of the front cover of the cylinder 15 and the outer portion 14A of the piston coupled to the rod 13, is doubled by a second central shorter spring 43 which is supported on the central portion 42B of the cover and is capable of coming into contact with the central portion 14B of the piston when the spring 19 is sufficiently compressed; a third spring 44, shorter than the spring 43, is supported on a central shoulder 42C of the cover and is capable of coming into contact with a central shoulder 14C of the piston when the springs 19 and 43 are sufficiently compressed.

It is immediately seen that the elastic resistance of the system increases as the piston 14 is moved further towards the left of FIG. 15.

In order to avoid the jolts caused by abrupt returns of the deformable elastic system to its initial position, the hydraulic compensation system described below is provided.

The piston 14 comprises in its thickness a certain number of openings 45 which are covered by an annular valve 46 urged towards its position of closure by a tension spring 47. Calibrated orifices 48 are formed in the valve 46, and correspond to the openings 45, forming the communication between the two faces of the piston 14. The body of the cylinder 15 is filled with a liquid having a viscosity independent of temperature, so that when the piston 14 is displaced from the right towards the left-hand side of the figure, the pressure of the liquid pushes back the valve 46 against the action of the spring 47, and the liquid passes almost freely from one face of the piston 14 to the other through the large openings 45 in this latter.

On the other hand, during the release of the spring or springs 19, 43 and 44, the movement of the piston 14 from the left to the right causes the valve 46 to close. The liquid can no longer pass from one face of the piston 46 to the other, except through the small calibrated orifices 48. There results, in consequence, a slowing-down of the speed of movement of the piston 14 and therefore a progressive braking on the release of the springs.

This passage of the liquid from one face of the piston to the other, taking place more readily during the compression of the springs than when the latter are released, gives a braking effect in both directions and effectively damps out oscillations.

The operation of the device according to the invention will now be described with reference to FIGS. 16 and 17, which relate to a suspension system in which the pivotal shaft 49 of the regulation device proper on the supports 27 of the vehicle 1 is not coincident with the pivotal axis 5 of the two constituent elements of the suspension device, namely the wheel-carrier lever 4 and the elastic system 15. According to the form of embodiment taken by way of example, the pivotal shaft 49 has been placed behind the shaft 5 substantially in the centre of the elastic unit 15.

FIG. 16 corresponds to the maximum high position of the vehicle (as in FIG. 12) while FIG. 17 corresponds to the maximum low position of the vehicle (as in FIG. 14).

It should be observed that while the arrangement of FIGS. 16 and 17 functions in the same manner as that of FIGS. 12, 13 and 14 as regards the deformable elastic system proper of the assembly 15, that is to say the compression of the spring or springs is zero in the case of FIG. 16 in which the wheel-carrier lever is vertical and this compression is a maximum and equal to a value $C \times l_2$ in the case of FIG. 17 in which the wheel-carrier lever is practically horizontal, it is different in respect of the regulation force to be applied to the whole of the device through the intermediary of the jack 35–41.

It has been seen that in the case of FIGS. 12, 13 and 14, the force is theoretically zero in the case of FIG. 12, increases in the case of FIG. 13, and becomes a maximum in the case of FIG. 14.

In the case of FIGS. 16 and 17, the force to be supplied by the jack is a maximum in the case of FIG. 17, diminishes as and when the shaft $3_{III}$ of the wheel approaches the vertical projection of the pivotal shaft 49, becomes zero when it reaches this vertical projection, and then becomes negative in the case of FIG. 16. The end of the movement would therefore be effected without the intervention of the regulating control and without effort.

It appears that in practice it will be easy to have the maximum forces compatible with the control devices by acting on the ratios between the mechanical advantages of the active forces and the reaction forces.

The control of the electric motors actuating the mechanical jacks or the valves of the hydraulic jacks which regulate the suspensions of each of the vehicle wheels may be either semi-automatic or manual.

It is in fact possible to have a manual control with respect to the horizontal trim of the vehicle and an automatic control with regard to the inclination of the vehicle inside the turning, with respect to the horizontal position to which the driver will have brought his vehicle.

The automatic control can advantageously be effected by a relay responsive to the action of a pendulum coming into operation by the action of centrifugal force as soon as the vehicle enters a turning, the said relay causing almost instantaneously the putting of the vehicle into its maximum high position on the outside and into its maximum low position on the inside. As soon as the action of the centrifugal force ceases, the relay operates in the reverse sense, and causes the vehicle to be brought back into its horizontal trim.

Suitably arranged fly-weights also assist in achieving the desired results.

The manual control of the various jacks can be obtained in many different ways, the only really imperative condition being that the two jacks which actuate the suspensions of the two right-hand wheels and the two jacks actuating the suspensions of the two left-hand wheels are controlled by two contacts placed on the steering wheel so that the driver can operate them without letting go of the steering wheel. These contacts will preferably be of the impulse type so that the controlled movement is carried out completely without having to keep the finger on the contacts.

The said contacts are advantageously connected in the supply circuits of the electric motors controlling the jacks in such manner that:

(1) The contact placed on the right-hand side of the steering wheel, when actuated alone, causes the lifting of the vehicle on the left-hand side and the lowering of the vehicle on the right-hand side;

(2) The contact mounted on the left-hand side of the steering wheel, when actuated alone, causes the vehicle to be lifted on the right-hand side and lowered on the left-hand side;

(3) When the vehicle is in a position inclined to the right or to the left, one of the two contacts on the steering wheel, whichever one it is, causes, when actuated, the return of the vehicle to its initial horizontal position;

(4) The two contacts on the steering wheel actuated simultaneously when the vehicle is in its low horizontal position, cause it to be rapidly raised to its high maximum position, and vice-versa.

This possibility open to the driver to put his vehicle very rapidly into the high position without releasing the steering wheel enables him to drive almost continuously in the low position, which improves road-holding since the centre of gravity is the lowest possible.

The bringing of the vehicle to any intermediate horizontal position is obtained by a special separate control mounted for example on the dashboard.

If the pilot sees an obstacle on the road, it is only necessary for him to pass into the high position almost instantaneously and to return immediately afterwards to the low position, without taking his hands from the steering wheel.

I claim:

1. An adjustable suspension for an automobile vehicle comprising as many independent suspension systems as there are wheels, each of said independent systems comprising the combination:
    (a) of a wheel-carrying lever pivoted on a shaft arranged in a horizontal plane and perpendicular to the longitudinal plane of symmetry of the vehicle, when this latter is moved in a straight line;
    (b) of a deformable elastic device adapted to pivot about the same pivotal axis as that of said wheel-carrier lever and to be locked in any given position;
    (c) of a coupling system between said wheel-carrier lever and said deformable elastic device, whereby any movement of the wheel causes the intervention of said deformable elastic device;
    (d) of pivotally mounted supporting means for the assembly comprising said wheel-carrier lever, said deformable elastic device and said coupling system;
    (e) of a control system adapted to cause said deformable elastic device to pivot about the pivotal axis of said supporting means between two extreme positions and to be locked in any required intermediate positions;
    (f) and of means for pivotally mounting said assembly comprising said elastic device, lever and control system with respect to the body of the vehicle, as concerns the front wheels.

2. An adjustable suspension according to claim 1, wherein the pivotal axis of said deformable elastic device and of said supporting means is coincident with the pivotal axis common to said wheel-carrier lever and said deformable elastic device.

3. An adjustable suspension according to claim 1, wherein the pivotal axis of said deformable elastic device and of said supporting means is displaced towards the rear with respect to the direction of forward running of the vehicle and is arranged parallel to the pivotal axis common to said wheel-carrier lever and said deformable elastic device.

4. An adjustable suspension according to claim 1, wherein the deformable elastic device is provided with an elastic system having a variable flexibility adapted to compensate for the variation of the force applied to the suspension member as a function of the relative position of the wheel-carrier lever and elastic device assembly with respect to the vehicle.

5. An adjustable suspension according to claim 1, further including a motor control means operatively connected to each of said control systems, and a pair of contacts mounted on the steering wheel of the vehicle and connected in the supply circuits of said motors to actuate the two systems of control actuating the suspensions of the two right-hand wheels of the vehicle and the two systems of control actuating the suspensions of the two left-hand wheels of the vehicle.

References Cited by the Examiner

UNITED STATES PATENTS

| | | | |
|---|---|---|---|
| 1,916,098 | 6/1933 | Dubonnet | 267—20 X |
| 2,074,103 | 3/1937 | Chryst | 267—20 |
| 2,199,392 | 5/1940 | Dabrasky | 267—20 |
| 2,913,253 | 11/1959 | Taber | 280—96.2 X |
| 3,082,017 | 3/1963 | Moore | 280—96.2 |
| 3,092,397 | 6/1963 | Dullabaun. | |

FOREIGN PATENTS 254,689  2/1927  Great Britain.

BENJAMIN HERSH, *Primary Examiner.*

W. A. MARCONTELL, M. S. SALES,
*Assistant Examiners.*